US008446589B2

(12) United States Patent
Strandjord et al.

(10) Patent No.: US 8,446,589 B2
(45) Date of Patent: May 21, 2013

(54) RESIDUAL INTENSITY MODULATION (RIM) CONTROL LOOP IN A RESONATOR FIBER-OPTIC GYROSCOPE (RFOG)

(75) Inventors: Lee Strandjord, Tonka Bay, MN (US);
Glen A. Sanders, Scottsdale, AZ (US);
Tiequn Qiu, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 396 days.

(21) Appl. No.: 12/581,715

(22) Filed: Oct. 19, 2009

(65) Prior Publication Data

US 2010/0225923 A1    Sep. 9, 2010

Related U.S. Application Data

(60) Provisional application No. 61/158,018, filed on Mar. 6, 2009.

(51) Int. Cl.
*G01C 19/72* (2006.01)

(52) U.S. Cl.
USPC ........................................................ 356/461

(58) Field of Classification Search
USPC ................................................ 356/459–476
See application file for complete search history.

(56) References Cited

U.S. PATENT DOCUMENTS

| | | | |
|---|---|---|---|
| 4,673,293 A | 6/1987 | Sanders | |
| 5,090,809 A | 2/1992 | Ferrar | |
| 5,296,912 A | 3/1994 | Strandjord | |
| 5,327,214 A | 7/1994 | Asami | |
| 5,563,705 A | 10/1996 | Sanders | |
| 5,627,644 A | 5/1997 | Sanders | |
| 6,204,921 B1 * | 3/2001 | Strandjord et al. | 356/460 |
| 6,445,455 B1 | 9/2002 | Hall et al. | |
| 7,327,460 B2 | 2/2008 | Sanders et al. | |
| 8,294,900 B2 * | 10/2012 | Strandjord et al. | 356/464 |
| 2007/0097374 A1 * | 5/2007 | Ren-Young | 356/460 |
| 2008/0218764 A1 | 9/2008 | Chen | |
| 2010/0002239 A1 | 1/2010 | Strandjord et al. | |

FOREIGN PATENT DOCUMENTS

WO      WO9641129      12/1996

OTHER PUBLICATIONS

European Patent Office, "European Search Report", mailed Feb. 21, 2012, Published in: EP.
Barbour, Neil M., "Inertial Navigation Sensors", "RTO-EN-SET-116(2008)", 2008, Publisher: NATO OTAN.
Wang, Xijing, "Digitalized Optical Ring Resonator Gyroscope Using Photonic Bandgap Fiber", "Thesis", Aug. 2008, Publisher: Department of Electronic Engineering, Graduate School of Engineering.
Yao et al., "FOG Source Error and Eliminating Analysis: Analysis on Light Source Intensity Noise and Noise Subtraction Method for Fib", "Laser Journal 2005", 2005, vol. 26, No. 5.

(Continued)

*Primary Examiner* — Hwa Lee
(74) *Attorney, Agent, or Firm* — Fogg & Powers LLC

(57) ABSTRACT

Systems and methods for reducing intensity modulation-induced rotation rate measurement error in a resonator optical gyroscope. The method includes tapping an intensity modulated light beam, directing a portion of the tapped light beam toward a photo detector, outputting from the photo detector a signal proportional to the amplitude variation of the light beam, amplifying the signal, and then providing the signal to the intensity modulator as a control input. Intensity modulation-induced error is reduced by an amount proportional to the gain of the feedback loop.

10 Claims, 7 Drawing Sheets

OTHER PUBLICATIONS

Ying et al., "Analysis of Kerr Effect in Resonator Fiber Optic Gyros With Triangular Wave Phase Modulation", "2010 Optical Society of America", Jan. 20, 2010, pp. 529-535, vol. 29, No. 3.
European Patent Office, "European Office Action", "from foreign counterpart of U.S. Application", Sep. 14, 2012, Published in: EP.
European Patent Office, "Communication under Rule 71(3) EPC" from Foreign Counterpart of U.S. Appl. No. 12/729,660, filed Jun. 22, 2012, pp. 1-7.
U.S. Patent and Trademark Office, "Notice of Allowance", U.S. Appl. No. 12/729,660, Jun. 29, 2012.

* cited by examiner

RESIDUAL INTENSITY MODULATION (RIM) CONTROL LOOP IN A RESONATOR FIBER-OPTIC GYROSCOPE (RFOG)

PRIORITY CLAIM

This application claims the benefit of provisional application Ser. No. 61/158,018, filed Mar. 6, 2009, of which is hereby incorporated by reference.

BACKGROUND OF THE INVENTION

A resonator optical gyroscope is a rotation rate sensing device that includes a resonant cavity. The resonant cavity supports light waves propagating in opposite directions (without loss of generality, they are referred to in the following as clockwise (CW) and counter-clockwise (CCW) directions, respectively). When there is a non-zero rotation rate around the normal axis of the resonator, the effective optical round-trip path length for the CW and CCW lightwaves is different, leading to a resonant frequency difference between them. By measuring this resonant frequency difference, rotation rate can be determined.

A resonator fiber-optic gyroscope (RFOG) is a special kind of resonator gyroscope that uses optical fibers in the resonator. Optical fiber increases the gyro signal-to-noise (S/N) sensitivity without significantly increasing the size of the sensing loop. For measuring the resonant frequency difference, monochromatic light waves are typically sinusoidal phase/frequency modulated and coupled into the RFOG resonator in the CW and CCW directions. Fractions of light circulating inside the resonator are coupled out of the resonator and converted to electronic signals at photodetectors. The electrical signals are demodulated at the corresponding modulation frequencies and used to servo the input light frequencies to the resonance frequencies of the CW and CCW cavity.

There are many methods to phase/frequency modulate light waves for an RFOG. One common approach is to use a lithium niobate phase modulator after the laser. Another approach is to modulate the injection current of a semiconductor laser. If the later method is used, the modulation of the injection current not only modulates the laser light frequency but also the light intensity. The resulting intensity modulation is at the same frequency as the laser frequency modulation.

If a phase modulator is used for phase modulation, along the optical path before and after the RFOG's phase modulator there can be polarization cross-coupling points due to imperfect fiber splices or polarization axis mismatch between the modulator waveguide and its pigtail fibers. Most of the optical power propagates in the optical path whose polarization state is aligned with the pass-axis of the modulator, as intended. But a small amount of cross-coupled optical power propagates in the optical path whose polarization state is orthogonal to the path's access of the modulator. At a cross-coupling point after the phase modulator, the interferences between the light waves propagating along the two orthogonal polarization axis of the modulator causes intensity modulation at the phase modulation frequency.

Intensity modulation leads to a non-zero photo detector output signal at the resonance center frequency. The non-zero photo detector output at resonance frequency causes the servo to move the laser frequency off the resonance frequency to eliminate the error. If both the CW and CCW laser frequencies are moved off resonance by the same amount and in the same direction (positive or negative phase), then the rotation sensing errors could cancel. However, it is unlikely that the intensity modulation in both beams is of the same magnitude and in the same direction.

SUMMARY OF THE INVENTION

The present invention generally relates to systems and methods for reducing intensity modulation induced rotation rate measurement error in a resonator optical gyroscope. The method includes the steps of (1) directing a light beam through an intensity modulator positioned upstream from a gyroscope resonator; (2) re-directing at least a portion of the light beam received from the intensity modulator toward a photo detector; (3) outputting from the photo detector a signal proportional to the amplitude of the re-directed light beam at a modulation frequency; (4) amplifying the outputted photo detector signal; and (5) providing the outputted signal to the intensity modulator as a control input. The method reduces the intensity modulation at the modulation frequency by an amount approximately proportional to the gain of the feedback loop. The system includes an intensity modulator, a tap coupler, a photo detector and a servo. The aforementioned components are connected in a series loop, in the order introduced, so that the tap coupler receives a light beam from the intensity modulator and the intensity modulator receives its control signal from the output of the servo.

BRIEF DESCRIPTION OF THE DRAWINGS

Preferred and alternative embodiments of the present invention are described in detail below with reference to the following drawings.

DETAILED DESCRIPTION OF ONE EMBODIMENT

Figure 1:
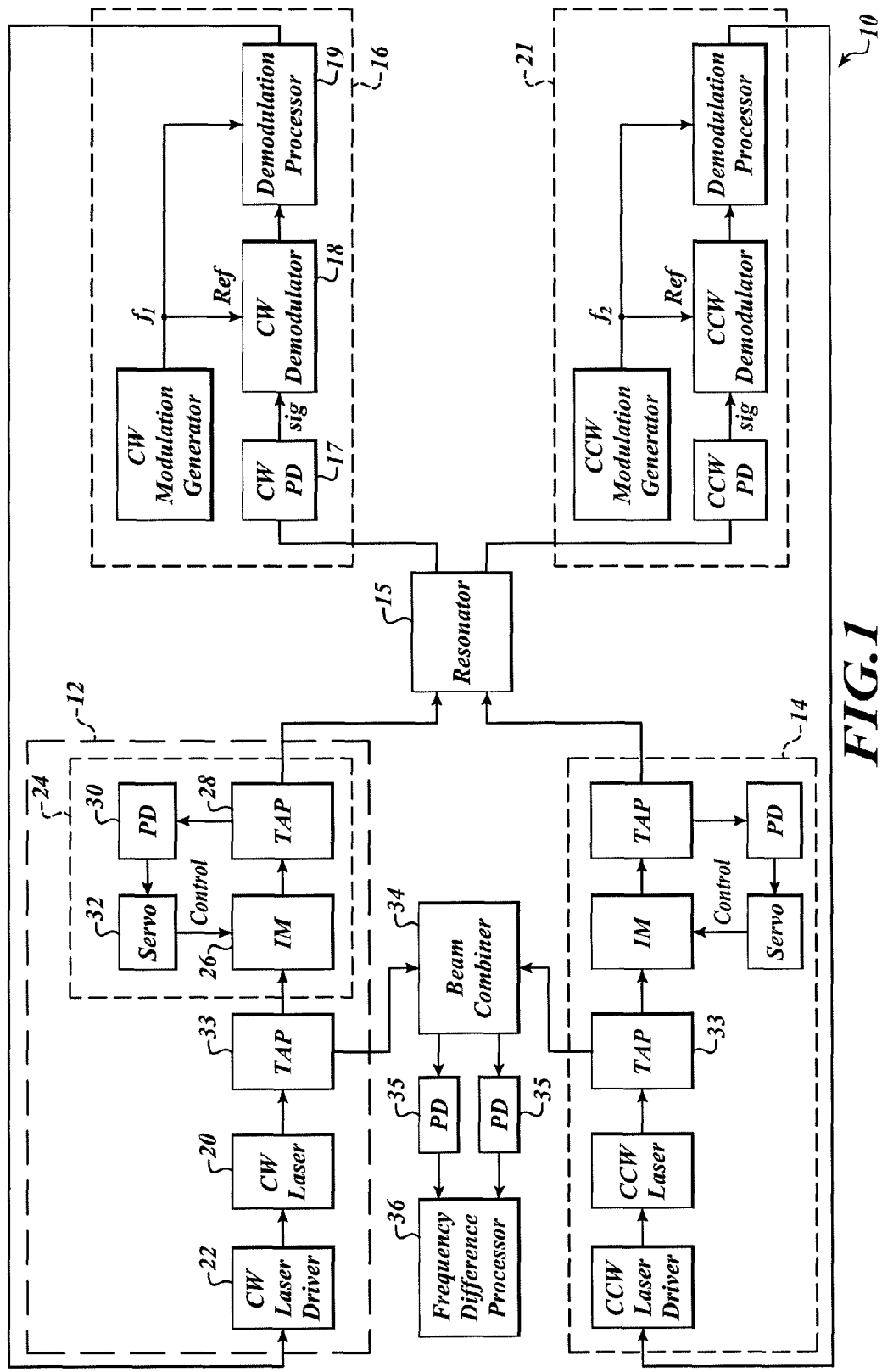
FIG. 1 is a block diagram of a resonator fiber-optic gyroscope (RFOG), including a residual intensity modulation (RIM) control loop according to an embodiment of the invention.

Compensation for rotational sensing bias due to intensity modulation error is achieved by incorporating a residual intensity modulation (RIM) servo loop into each of two clockwise and counterclockwise laser sources of a resonator fiber-optic gyroscope (RFOG). FIG. 1 shows an RFOG 10 including two laser sources—a clockwise (CW) laser source 12 and a counterclockwise (CCW) laser source 14. The outputs of each of the two sources 12, 14 are coupled to the input of a resonator 15. The output of the resonator 15 is coupled to clockwise and counterclockwise demodulation components 16, 21 that provide a feedback signal to the clockwise and counterclockwise laser sources 12, 14.

The clockwise laser source 12 includes a laser 20, a laser driver 22 and a residual intensity modulation (RIM) control loop 24. The RIM control loop 24 includes an intensity modulator 26, a tap coupler 28, a servo loop photo detector 30 and a RIM servo electronics component 32. The clockwise demodulation component 16 includes a demodulation photo detector 17, a demodulator 18, and a demodulation processor 19.

The components of the clockwise laser source 12 are connected in a serial branch, as follows: the laser driver 22 to the laser 20 to the intensity modulator 26 to the tap coupler 28 to the resonator 15. The components of the RIM control loop 24 are connected in a series loop, as follows: the intensity modulator 26 to the tap coupler 28 to the servo loop photo detector 30 to the RIM servo electronics component 32 and back to the intensity modulator 26. The components of the clockwise demodulation component 16 are connected in a serial branch, as follows: the demodulation photo detector 17 to the demodulator 18 to the demodulation processor 19. The output of the demodulation processor 19 is connected back to the laser driver 22. The CCW laser source 14 includes a complementary set of components connected in a complementary arrangement to those included in the CW laser source 12. The CCW demodulator component 21 also includes a complementary set of components connected in a complementary arrangement to those included in the CW demodulation component 16.

In operation, the laser driver 22 drives the laser 20 to output a light beam at a given frequency. Light from the laser 20 passes through the intensity modulator 26 and the tap coupler 28 before being received by the resonator 15. The resonator 15 receives light simultaneously from the CW and CCW laser sources 12, 14, with the light beams from the two sources 12, 14 traveling around the resonator 15 in opposite directions. The demodulation components 16, 21 each receive a light beam from the resonator 15, and by detecting a signal that is indicative of the difference in the resonance frequency and the laser frequency, maintain each laser frequency at each corresponding resonance frequency.

Each demodulation component 16, 21 also outputs to the laser driver 22, which continuously drives the laser 20 to resonance frequency by continuously adjusting the frequency to keep the demodulated photo detector output signal equal to zero. This maintains the each light beam at resonance frequency.

The measure of rotation rate is the measure of the frequency difference between the CW and CCW resonance frequency. Since the laser frequencies are controlled to the resonance frequencies, the difference between the laser frequencies is a measure of rotation rate. To measure the difference between the laser frequencies, a small portion of light is tapped off from each beam just after the lasers by tap couplers 33. The tapped light from both beams is combined at a beam combiner 34. The beam combiner 34 has two outputs, each going to a photodetector 35. The CW and CCW laser beams interfere at the two photodetectors 35 and produce a beat signal that is an intensity variation that has a frequency equal to the frequency difference between the two laser beams. The outputs of the photodetectors 35 go to a frequency difference processor 36 which measures the frequency of the beat signal, thus the frequency difference between the two lasers. Two detectors are necessary to determine the sign of the frequency difference.

The RIM servo loop 24 compensates for the offset between the actual resonance frequency and the frequency at which the demodulation output signal equals zero (the intensity modulation bias error). The intensity modulator 26 corrects for this difference by controlling intensity variations occurring at frequencies around the modulation frequency. The intensity modulator 26 is controlled by a negative feedback signal received at its control port from the RIM servo electronics component 32. The tap coupler 28 takes a small portion of light, typically 5% to 10% of the overall beam, and re-directs the light to the servo loop photo detector 30. The servo loop photo detector 30 outputs a voltage signal proportional to the amplitude of the intensity modulation in the light signal. The RIM servo electronics component 32 amplifies the voltage signal from the servo loop photo detector 30 and then feeds the signal to the intensity modulator control port. The reduction in intensity modulation is proportional to the open loop gain of the RIM servo electronics component 32 at the modulation frequency.

Figure 2:
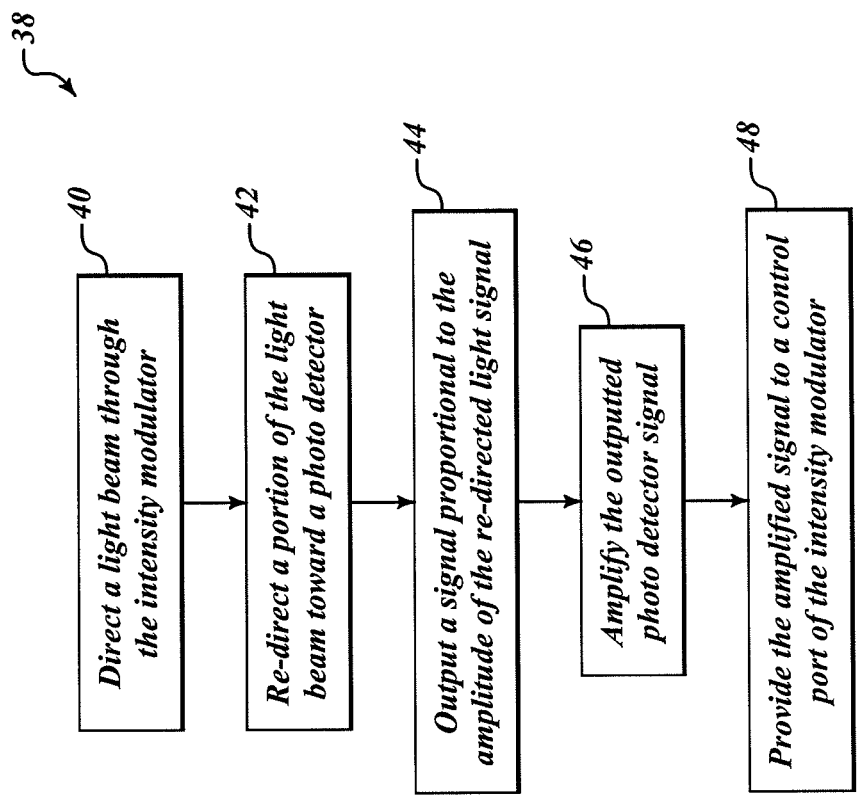
FIG. 2 is a flowchart of a method for reducing intensity modulation induced rotation rate measurement error in the RFOG.

FIG. 2 shows an example method 38 for reducing intensity modulation induced rotation rate measurement error in the resonator fiber-optic gyroscope 10. First, at a block 40, a light beam is directed from the laser 20 through the intensity modulator 26. Next at a block 42, at least a portion of the light beam received from the intensity modulator 26 is re-directed toward the servo loop photo detector 30 using the tap coupler 28. Next, at block 44, the servo loop photo detector 30 outputs a voltage signal proportional to the amplitude of the re-directed light beam at a modulation frequency. Next, at a block 46, the outputted photo detector signal is amplified at the RIM servo electronics component 32. Last, at a block 48, the amplified signal is provided to the control port of the intensity modulator 26. With the feedback, the intensity modulator 26 reduces amplitude variations at the modulation frequency due to intensity modulation by an amount approximately proportional to the gain of the feedback loop.

Figure 3:
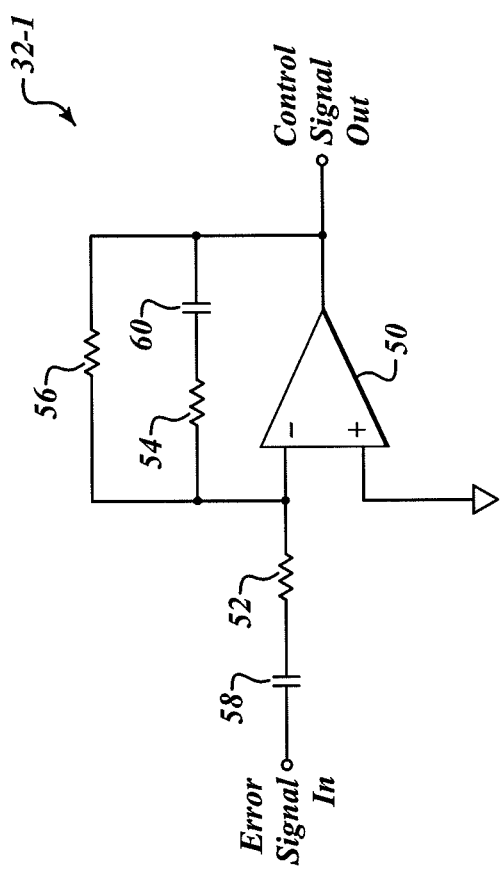
FIG. 3 shows an electrical schematic of a residual intensity modulation servo.

FIG. 3 shows a first embodiment of RIM servo electronics component 32-1. The RIM servo electronics component 32-1 includes an operational amplifier 50, an input resistor 52, first and second feedback resistors 54, 56, an input capacitor 58 and a feedback capacitor 60.

The RIM servo electronics component 32-1 forms an operational amplifier integrator circuit. The operational amplifier 50 has its positive input connected to ground and its output as the RIM servo signal output, which is connected to the input control port of the intensity modulator 26. The negative input of the operational amplifier 50 is connected to the RIM servo input through a series connection of the input resistor 52 and the input capacitor 58. The negative input and the output of the operational amplifier 50 are also connected through a feedback loop, including a parallel circuit connection of a first branch having the first feedback resistor 54 and the feedback capacitor 60 in series, and a second branch having the second feedback resistor 56. The RIM servo electronics component 32-1 has as its input a signal received from the servo loop photo detector 30 and has its output fed to the input control port of the intensity modulator 26.

Figure 4:
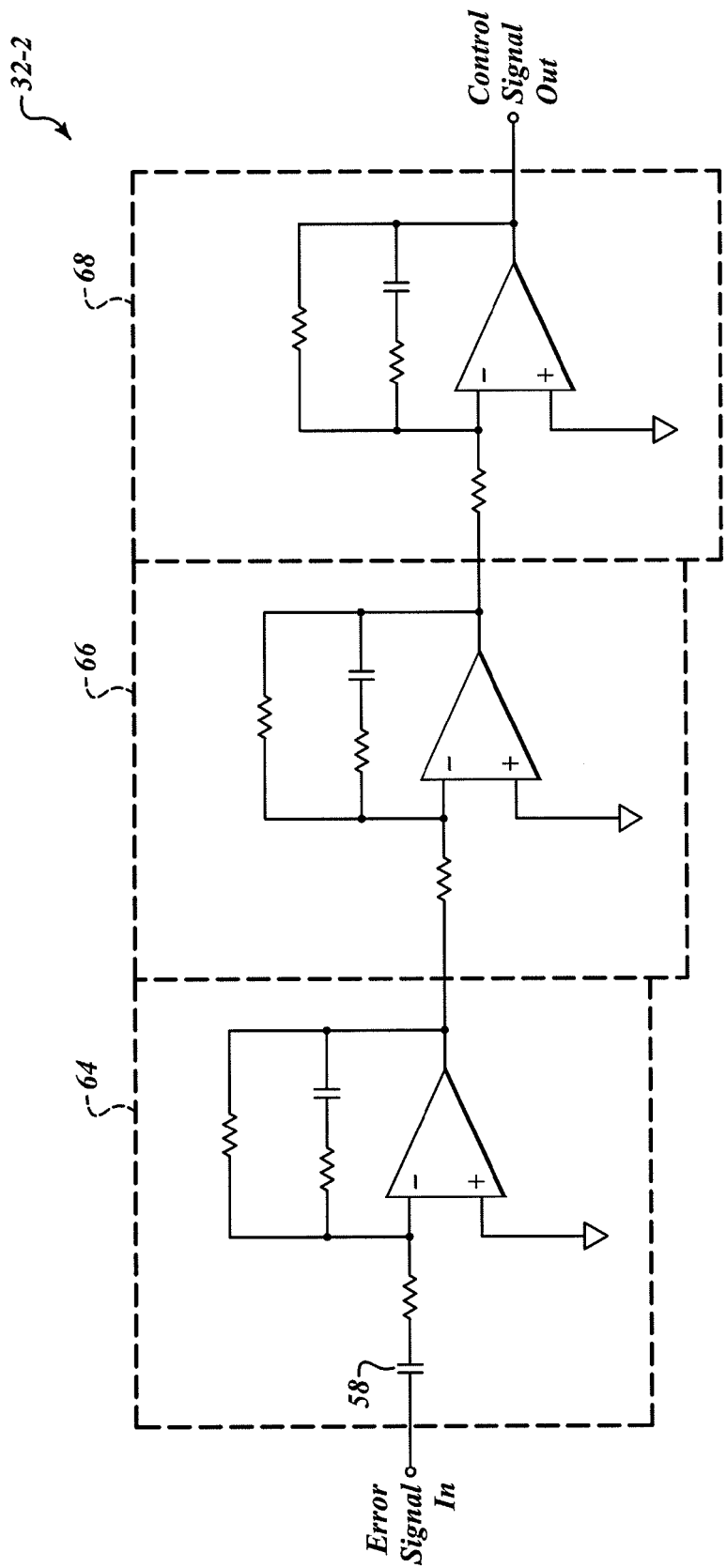
FIG. 4 shows an electrical schematic of a second embodiment of the residual intensity modulation servo.

FIG. 4 shows a second embodiment of a RIM servo electronics component 32-2. The RIM servo electronics component 32-2 includes three stages, connected in series, of the first embodiment 32-1. The only difference is that the input capacitor 58 appears only once, at the input of a first stage 64, and does not appear at the input of subsequent second and third stages 66, 68.

Figure 5:
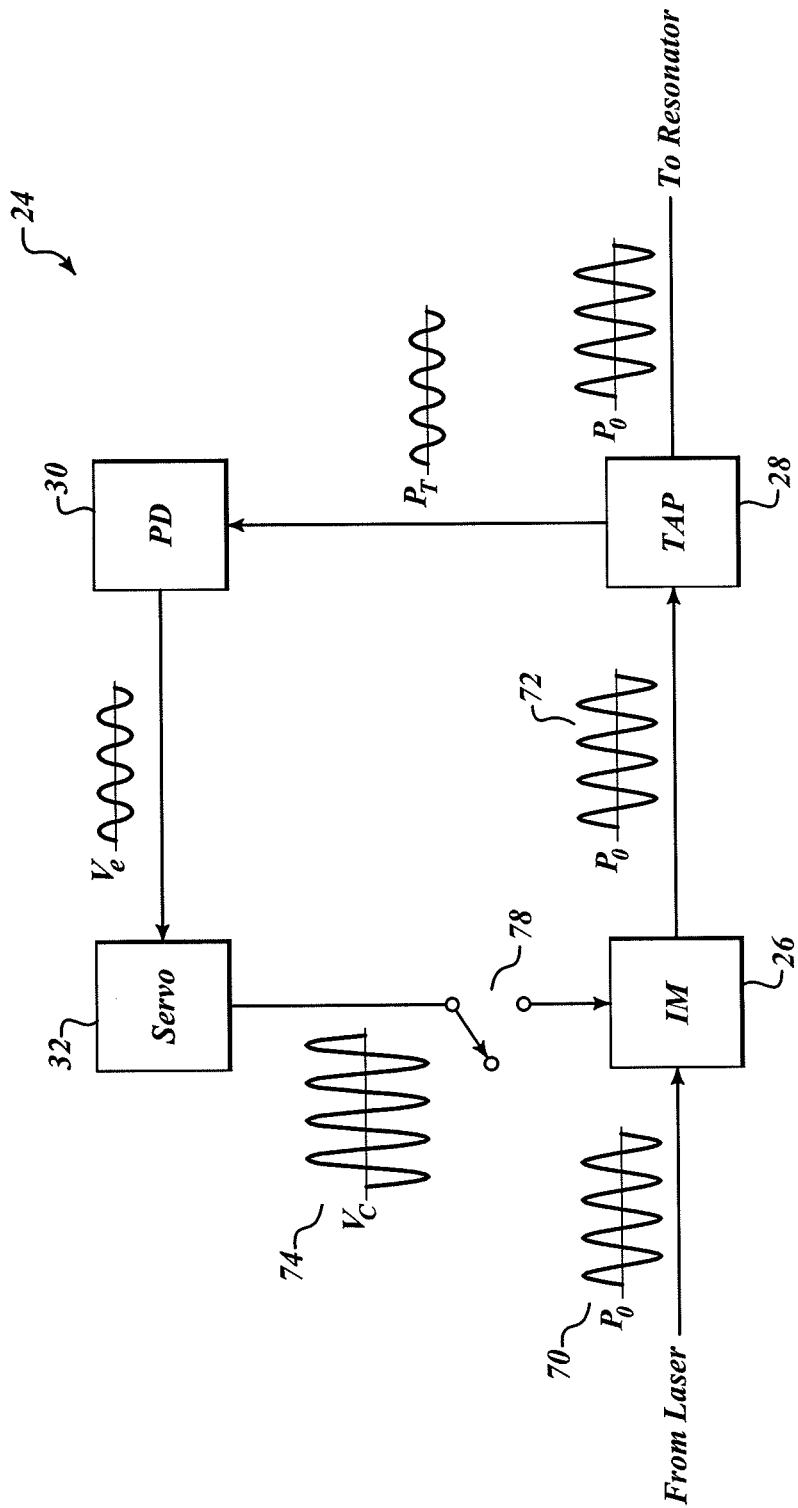
FIG. 5 shows a block diagram of the RIM control loop with an example signal at each node for the case of an open loop configuration.

FIG. 5 shows representative signal amplitudes at various nodes of the RIM control loop 24 in open loop configuration. Among the signals of the RIM control loop 24 are an intensity modulator input signal 70, an intensity modulator output signal 72, and a RIM servo output signal 74. The RIM control loop 24 switches between open and closed loop configurations by a switch 78 between the RIM servo electronics component 32 and the control input of the intensity modulator 26. With the RIM control loop 24 in open loop configuration, the intensity modulator output signal 72 is unchanged in amplitude from the intensity modulator input signal 70, and the amplitude of a RIM servo output signal 74 is large. This result shows that intensity variations occurring at frequencies around the modulation frequency are not being controlled.

Figure 6:
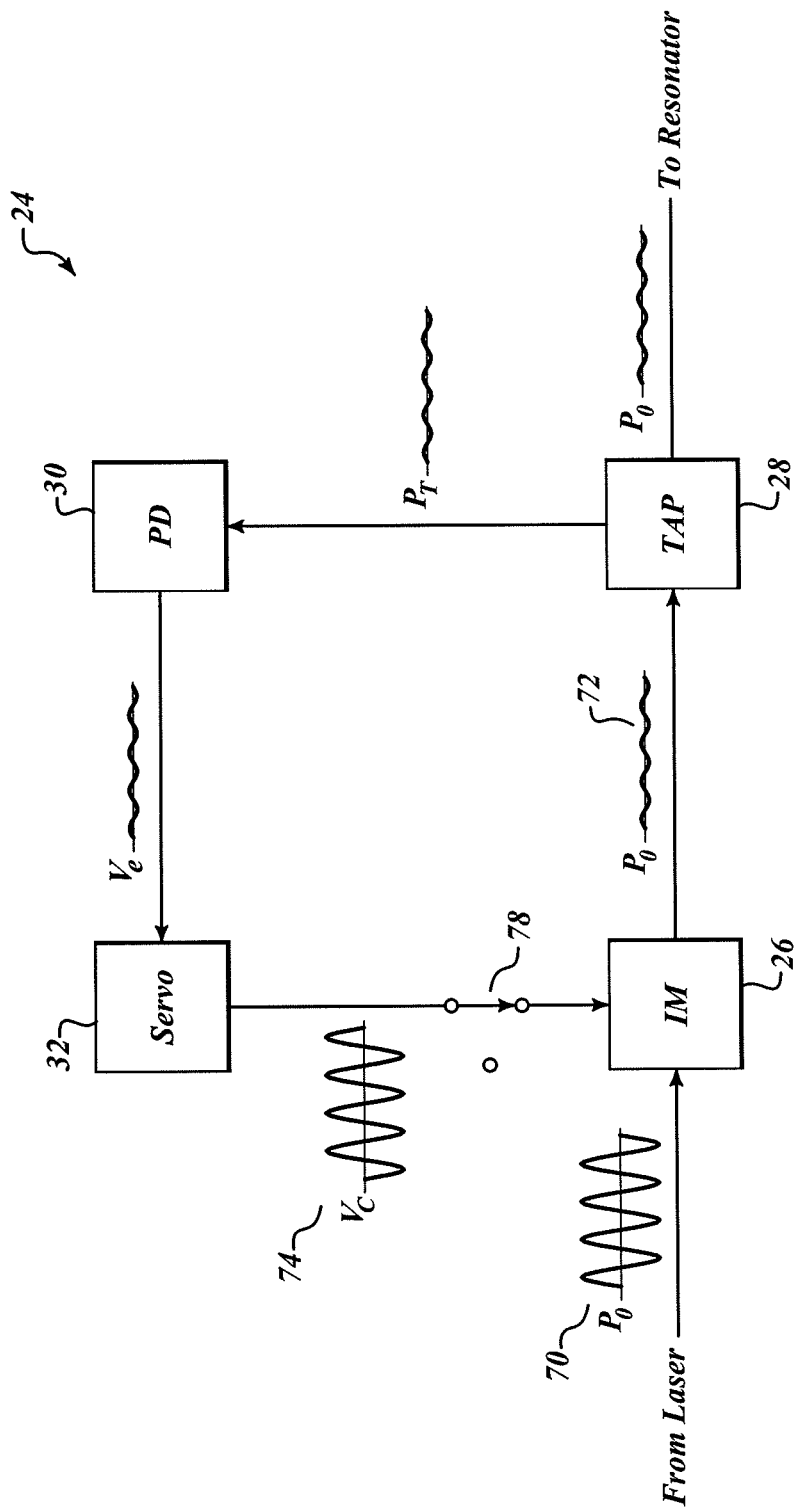
FIG. 6 shows a block diagram of the RIM control loop with an example signal at each node for the case of a closed loop configuration.

FIG. 6 shows representative signal amplitudes at nodes of the RIM control loop 24 with the control loop 24 in the closed loop configuration (with the switch 78 closed). The result is that the amplitude of the intensity modulator output signal 72 is small compared with the intensity modulator input signal 70, and the amplitude of the RIM servo output signal 74 is not as large as in open loop configuration of FIG. 4. This result shows that intensity variations occurring at frequencies around the modulation frequency are being controlled by the RIM control loop 24.

Figure 7:
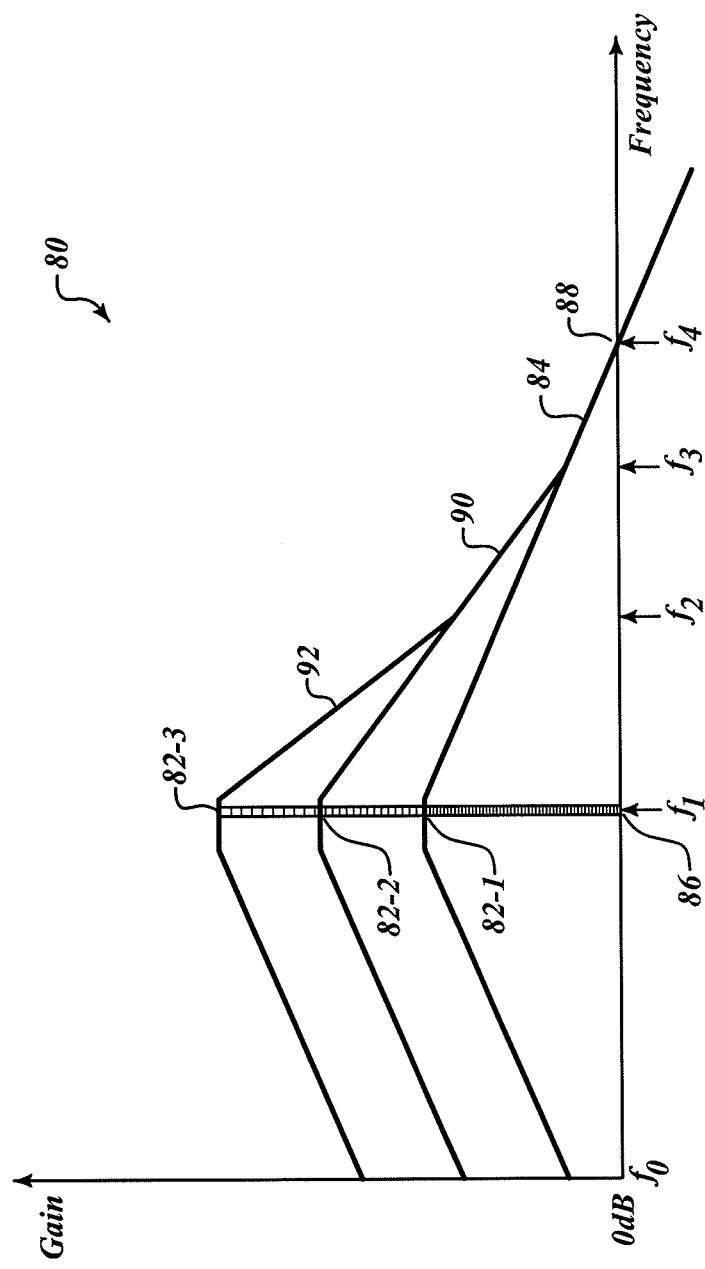
FIG. 7 shows a bode plot of the response of the open loop configuration of the RIM control loop.

FIG. 7 shows a bode plot 80 of possible responses for an open loop gain of the RIM servo electronics component 32. For a first order loop such as the first RIM servo electronics component 32-1, a gain 82-1 rolls off with frequency at a rate of 20 dB per decade, represented by a first order response 84. The actual gain 82-1 at a modulation frequency 86 is determined by the rate of roll-off and a unity gain crossover frequency 88 in the open loop configuration. Therefore, the overall gain 82-1, and corresponding reduction in intensity modulation, can also be increased by increasing the unity gain crossover frequency 88. However, there are practical limits to how high the unity gain crossover frequency 88 can be raised, which limit the maximum reduction in intensity modulation.

Additional gain at the modulation frequency 86 can be achieved without increasing the unity gain crossover frequency 88 by making the RIM servo electronics component 32 a second or third order amplifier. For a second order loop, an increased gain 82-2 rolls off with frequency at a rate of 40 dB per decade, represented by a second order response 90. For a third order loop, such as the second RIM servo electronics component 32-2 of FIG. 3, an increased gain 82-3 rolls off with frequency at a rate of 60 dB per decade, represented by a third order response 92.

Intensity modulation at the modulation frequency is reduced by approximately the gain of the feedback loop. Therefore, the feedback loop is designed to have maximum gain at or near the modulation frequency. To achieve very high gain the bandwidth of the feedback loop must be much higher than the modulation frequency. RFOG modulation frequencies are typically in the range of 20 kHz to 200 kHz. Therefore, if a feedback loop gain of 60 dB is desired at 100 kHz, then the feedback loop unity gain frequency needs to be at least 100 MHz for a first order loop and roughly 10 MHz for a second order loop. These high frequencies mean that the intensity modulation needs to have a bandwidth greater than the unity gain frequency, thus a very high bandwidth. Two example intensity modulators having a bandwidth greater than the unity gain frequency are a lithium niobate modulator and an electroabsorption modulator.

While one embodiment of the invention has been illustrated and described, as noted above, many changes can be made without departing from the spirit and scope of the invention. Accordingly, the scope of the invention is not limited by the disclosure of one embodiment. Instead, the invention should be determined entirely by reference to the claims that follow.

The embodiments of the invention in which an exclusive property or privilege is claimed are defined as follows:

1. A method for improving the performance of a gyroscope, comprising:
providing a light beam from a laser source as an input for a resonator, wherein providing the light beam comprises:
measuring intensity modulation-induced amplitude variation in the light beam;
modulating the light beam to reduce intensity modulation-induced measurement error by controlling intensity variations occurring at frequencies around the modulation frequency, wherein the modulation is controlled by a negative feedback signal received from a servo electronics component;
receiving the light beam from the resonator in a demodulation component to detect a signal that is indicative of the difference in the resonance frequency and the laser frequency; and
driving the light beam produced by the laser source to a resonance frequency with the detected signal.

2. The method of claim 1, further comprising:
directing the light beam to an intensity modulator positioned upstream from a gyroscope resonator;
re-directing at least a portion of the light beam received from the intensity modulator toward a photodetector;
outputting from the photo detector a signal proportional to an amplitude of the re-directed light beam at a modulation frequency;
providing an outputted signal to the intensity modulator as a control input; and
the modulating comprises modulating the light beam with the intensity modulator using the outputted signal as a control input.

3. The method of claim 1, further comprising amplifying the output of the negative feedback loop before providing the output to an intensity modulator.

4. The method of claim 1, wherein the gyroscope is a component of a resonance fiber-optic gyroscope (RFOG).

5. An apparatus for improving resonator fiber optic gyroscope performance comprising:
at least one laser source comprising a residual intensity modulation servo loop configured to reduce intensity modulation-induced measurement error by controlling intensity variations occurring at frequencies around the modulation frequency, wherein the modulation is controlled by a negative feedback signal received from a servo electronics component in the servo loop;
a resonator coupled to receive a light beam from the at least one laser source; and
a demodulation component coupled to receive the light beam from the resonator, wherein the demodulation component detects a signal that is indicative of the difference in the resonance frequency and the laser frequency, the signal driving the at least one laser source such that the light beam is driven to a resonance frequency.

6. The apparatus of claim 5, wherein the residual modulation servo loop comprises:
an intensity modulator;
a tap coupler; and
a photo detector;
wherein an input of the intensity modulator is communicatively coupled with the output of the laser source, an input of the tap coupler is communicatively coupled with an output of the intensity modulator, an input of the photo detector is communicatively coupled with an output of the tap coupler, and an output of the photo detector is communicatively coupled with a control port of the intensity modulator; and wherein the intensity modulator reduces amplitude variation in a light beam received from the laser source in response to a feedback signal from the photo detector.

7. The apparatus of claim 6, wherein an input of the servo electronics component is communicatively coupled with the output of the photo detector, wherein an output of the servo electronics component is communicatively coupled with the control port of the intensity modulator, and wherein the servo electronics component amplifies the feedback signal from the photo detector before delivering the signal to the intensity modulator control port.

8. A system for improving the performance of a gyroscope, comprising:
- a means for directing a light beam to an intensity modulation means positioned upstream from a gyroscope resonator;
- a means for re-directing at least a portion of the light beam received from the intensity modulation means;
- a means for measuring intensity modulation-induced amplitude variation in a light beam;
- a means for outputting a signal proportional to intensity modulation-induced amplitude of the re-directed light beam; and
- wherein the intensity modulation means, to reduce intensity modulation-induced measurement error, modulates the light beam using the outputted signal as a control input.

9. The system of claim 8, further comprising a means for amplifying the outputted signal before providing the outputted signal to the intensity modulation means.

10. The system of claim 8, wherein the gyroscopic resonator is a component of a resonance fiber-optic gyroscope (RFOG).

* * * * *